United States Patent [19]

Iijima et al.

[11] Patent Number: 4,983,916

[45] Date of Patent: Jan. 8, 1991

[54] COMPACT MAGNETIC ENCODER

[75] Inventors: Kenzaburou Iijima; Yoshinori Hayashi; Seiya Nishimura, all of Shizuoka, Japan

[73] Assignee: Yamaha Corporation, Japan

[21] Appl. No.: 301,815

[22] Filed: Jan. 25, 1989

[30] Foreign Application Priority Data

Jan. 26, 1988 [JP] Japan .................................. 63-14981
Jan. 26, 1988 [JP] Japan .................................. 63-14982

[51] Int. Cl.⁵ ..................... G01B 7/14; G01N 27/72; G01R 33/12
[52] U.S. Cl. ........................ 324/207.21; 324/207.25; 324/235; 338/32 R
[58] Field of Search ............... 324/173, 174, 207, 208, 324/235, 251, 252; 338/32 R, 32 H; 310/67 R, 68 R, 68 B, 156, 168, 171

[56] References Cited

U.S. PATENT DOCUMENTS

| | | | |
|---|---|---|---|
| 4,257,040 | 3/1981 | Sherasaki et al. | 324/174 |
| 4,488,076 | 12/1984 | MaCleod | 310/171 |
| 4,656,377 | 4/1987 | Akiyama et al. | 338/32 R |
| 4,851,752 | 7/1989 | Nishimura et al. | 318/602 |

Primary Examiner—Walter E. Snow
Attorney, Agent, or Firm—Ostrolenk, Faber, Gerb & Soffen

[57] ABSTRACT

In construction of a magnetic encoder used for detection of displacement of a mobile body, a circular magnetized pattern is formed on one longitudinal end face of a magnetic rotary spindle mechanically coupled to the mobile body, and a magnetic sensor faces the magnetized pattern with a prescribed gap. Direct formation of the magnetized pattern on the rotary spindle excludes production errors caused by the conventional coupling process and end-face magnetization assures significant compactness of the entire construction.

2 Claims, 4 Drawing Sheets

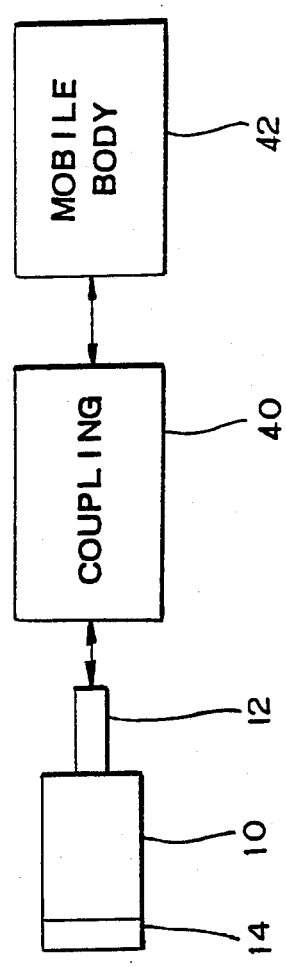

COMPACT MAGNETIC ENCODER

BACKGROUND OF THE INVENTION

The present invention relates to an improved magnetic encoder, and more particularly relates to production of a magnetic encoder adapted for detection of angular displacement, linear displacement and displacement speed of a mobile body in a drive system for robots or NC devices.

Conventional magnetic encoders are roughly classified into two typical groups each of which includes a rotary spindle mechanically coupled to the drive system. Such a rotary spindle is generally mounted to a housing via suitable bearings. In the case of the first group, a drum-type magnetic recording medium is coaxially coupled to the rotary spindle outside the housing and a magnetized pattern is formed on the peripheral face of the drum. A magnetic detection head is arranged facing the magnetized pattern on the drum while leaving a prescribed clearance. In the case of the second group, a disc-type magnetic recording medium is again coaxially coupled to the rotary spindle outside the housing and a magnetized pattern is formed on the end face of the disc along the periphery. A magnetic detection head is arranged facing the magnetized pattern on the disc while leaving a prescribed clearance.

In either group, as a recording medium rotates with the rotary spindle, a magnetic field applied to the detection head varies as the magnetized pattern on the recording medium moves and, in response such variation in the magnetic field, the detection head generates a series of output signals representative of the magnetic pattern on the recording medium for detection of angular displacement, linear displacement or displacement of the mobile body in the drive system connected to the rotary spindle.

Since the recording medium is prepared separate from the rotary spindle, both have to be mechanically coupled to one another during production, and such coupling process requires much labour and time. In addition, the degree of preciseness of this coupling process poses a serious influence on the functional reliability of the magnetic encoder. That is, for correct detection of the displacement or displacement speed of the mobile body, the clearance between the detection head and the magnetized pattern on the recording medium has to be maintained as constant as possible during rotation of the recording medium. In practice, however, the clearance inevitably fluctuates due to production errors mainly caused by a low degree of preciseness in coupling. It is extremely difficult to achieve the coupling process with a sufficiently high degree of preciseness.

In order to remove such drawbacks, it was proposed by the inventors of the present invention in a copending U.S. patent application Ser. No. 168,160 filed on Mar. 15, 1988, now U.S. Pat. No. 4,851,752 to form a magnetized pattern on the peripheral face of a rotary spindle made of a magnetic material. By using the rotary spindle itself as a recording medium, it is no longer necessary to mechanically couple a recording medium to the rotary spindle and the functional reliability of the magnetic encoder is much improved due to absence of a coupling process of a low degree a preciseness. However, such a peripheral-magnetization type magnetic encoder requires arrangement of a detection head in a face-to-face relationship to the peripheral face of the rotary spindle. This arrangement makes it difficult to achieve compactness of the magnetic encoder, which is nowadays generally demanded in the field of electric and electronic devices.

SUMMARY OF THE INVENTION

It is an object of the present invention to raise the functional reliability of a magnetic encoder without enlarging its construction.

In accordance with a basic aspect of the present invention, a magnetized pattern is formed circularly on one longitudinal end face of a rotary shaft made of a magnetic material along the periphery of such shaft, and a detection head is arranged facing the magnetized pattern with a prescribed clearance.

BRIEF DESCRIPTION OF THE DRAWINGS

Other features and advantages of the present invention will become apparent from the following description of the invention which refers to the accompanying drawings, in which:

FIG. 1A is a schematic view partially in block form illustrating the mechanical coupling of a rotary spindle of FIG. 1 to a mobile body.

DESCRIPTION OF THE PREFERRED EMBODIMENTS

Figure 1:
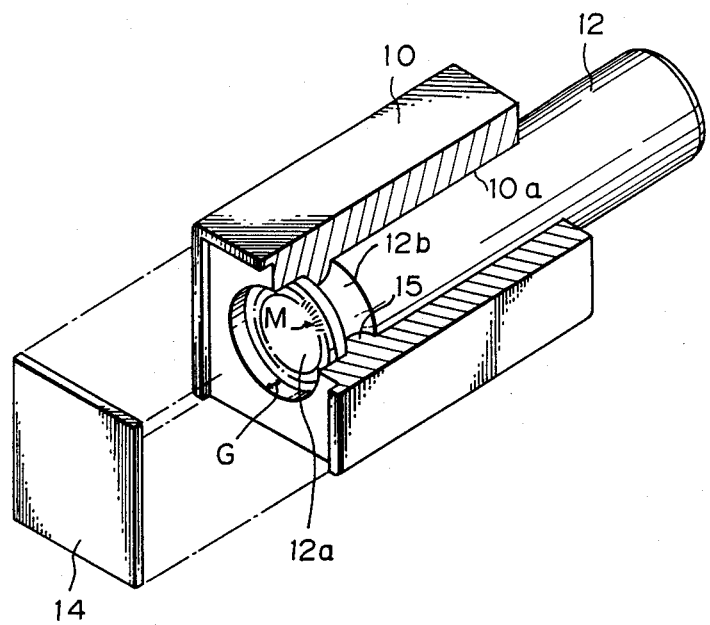
FIG. 1 is a perspective view, partly cut out, of one embodiment of the magnetic encoder in accordance with the present invention.

One embodiment of the magnetic encoder in accordance with the present invention is shown in FIG. 1, in which a rotary spindle 12 is rotatably held in a housing 10 and a magnetized pattern M is formed on one end 12a circularly along the periphery of the rotary spindle 12. A magnetic sensor 14 is attached to the housing 10 facing the end 12a of the rotary spindle 12 with a prescribed clearance G for magnetic detection of the magnetized pattern M on the end face 12a. In the illustration, the housing 10 is partly cut out and the magnetic sensor 14 is detached from the housing to facilitate understanding of the construction.

The housing 10 is rectangular solid in shape and made by, for example, injection moulding of synthetic resin. The housing 10 is provided with an axial through-hole 10a of a diameter slightly larger than the outer diameter of the rotary spindle 12. Near one open end of the through-hole 10a there is provided an annular projection 15 for engagement with an annular recess 12b formed in the peripheral face of the rotary spindle 12. This engagement inhibits movement of the rotary spindle 12 in the axial direction.

In producing of the housing 10, the rotary spindle 12 is coated with a thin layer of a demoulding agent before injection moulding of synthetic resin. Thereafter, the demoulding agent is removed by means of thermal or chemical treatment. By this removal of the demoulding agent, a small gap is left between the outer face of the rotary spindle 12 and the inner face of the housing 10 for free axial rotation of the rotary spindle 12.

Figure 2:
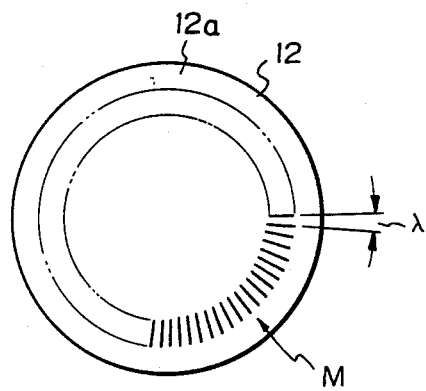
FIG. 2 is an end view of the magnetic encoder shown in FIG. 1, FIGS. 3A and 3B are sectional side and plan views of one embodiment of a magnetic sensor used for the magnetic encoder shown in FIG. 1, FIGS. 4A to 4C are plan views of other embodiments of the magnetic sensor.

The rotary spindle 12 is made of a highly workable, high magnetic material such as Fe—Cr—Co type or Fe—Co—Mg type alloys. The one longitudinal end face 12a of the rotary spindle 12 is provided with the magnetized pattern M formed circularly along the periphery of the rotary spindle 12. Magnetization is carried out using a sine wave of a wavelength $\lambda$ and, as a consequence, the magnetized pattern has a constant pitch equal to the wavelength $\lambda$ as shown in FIG. 2.

FIG. 1A illustrates an intended connection of a magnetic encoder of FIG. 1 to a mobile body, identified in block at 42. The mechanical coupling identified at 40 would, thus, couple the rotary spindle 12 to a mobile body undergoing angular displacement, linear displacement or displacement in a drive system for robots and NC devices.

Figure 3A:
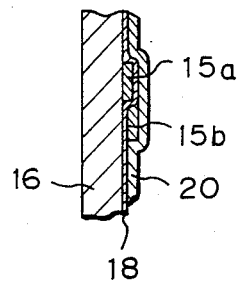
Figure 3B:
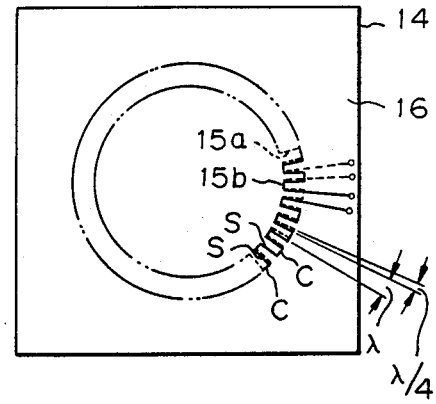

One embodiment of the magnetic sensor 14 is shown in FIGS. 3A and 3B. The magnetic sensor 14 is made up of magnetic resistor elements which vary the inherent resistance depending on the intensity of a magnetic field applied to the magnetic sensor 14. More specifically, the first MR (magnetic resistor) element 15a is formed on a glass substrate 16 by means of vapor deposition. This first MR element 15a is covered with an insulating layer 18 made of, for example, oxidized silicon. The second MR element 15b is further formed on the insulating layer 18 by means of vapor deposition. This second MR element 15b is covered with a protective layer 20 made of, for example, phospho-silicate-glass. The first and second MR elements 15a, 15b are made of high magnetic materials such as Ni—Fe alloys and Ni—Co alloys, or semiconductors such as InSb and GaAs. The circular arrangement of the first and second MR elements 15a, 15b on the glass substrate 16 just corresponds to the circular arrangement of the magnetized pattern M on the end face 12a of the rotary spindle 12. More specifically, the magnetic sensor 14 is made up of a plurality of sensor sections S and a plurality of connector sections C arranged alternately in a circular track. The adjacent sensor sections S are spaced apart by a distance equal to the wavelength $\lambda$. The first MR element 15a is phased from the second MR element 15b by a distance equal to $\lambda/4$. In this way, the first and second MR elements 15a and 15b are electrically separated from each other by the insulating layer 18 and phased from the magnetized pattern M on the end face 12a of the rotary spindle 12 by a distance equal to $\lambda/4$ (=90°).

As the rotary spindle 12 rotates, the magnetized pattern M on its end face 12a undergoes a relative displacement with respect to the sensor sections S of the magnetic sensor 14 and sine wave and cosine wave detection signals are issued from the first and second MR elements 15a, 15b with 90° phase difference in accordance with the extent of displacement. By suitable known processing of the detection signals, the extent and the direction of the rotary spindle 12 are detected.

Because the magnetized pattern M is formed directly on the end face 12a of the rotary spindle 12, it is no longer required to mechanically couple a recording medium to a rotary spindle and, as a consequence, the functional reliability of the magnetic encoder is mush improved. Further, since the magnetic sensor 14 is arranged facing one longitudinal end face of the rotary spindle 12, the entire construction of the magnetic encoder is made very compact.

Figure 4A:
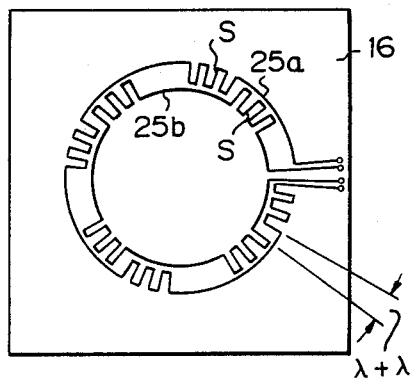
Figure 4B:
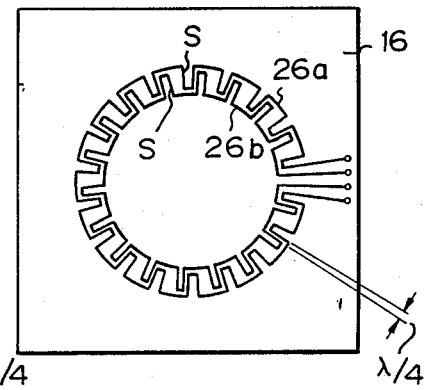
Figure 4C:
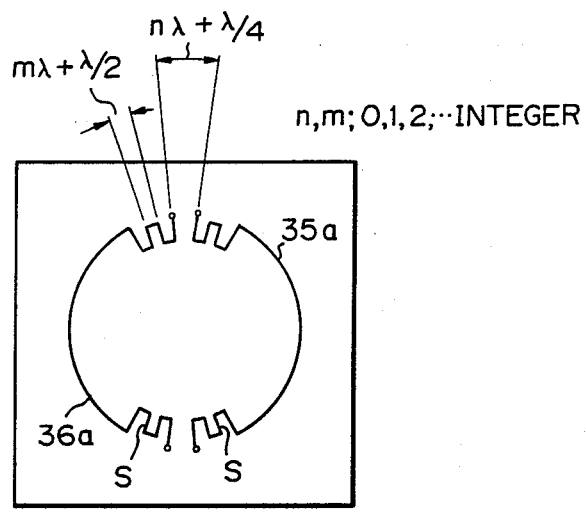

Other embodiments of the magnetic sensor 14 are shown in FIGS. 4A and 4C. In the arrangement shown in FIG. 4A, the first and second MR elements 25a, 25b are concentrically arranged without radial superposition. The outer first MR element 25a is made up of four pairs of sensor sections S spaced circularly at equal intervals. Similarly, the inner second MR element 25b is made up of four pairs of sensor sections S spaced circularly at equal intervals. Each sensor section S of the first MR element 25a is phased from an adjacent sensor section S of the second MR element 25b by a distance equal to $(n+1/4)\lambda$ where n is 0 or a positive integer.

In the arrangement shown in FIG. 4B, the first and second MR elements 26a, 26b are concentrically arranged with an alternate disposition. The MR elements 25a and 26b are both made up of a plurality of circularly arranged sensor sections S.

In the arrangement shown in FIG. 4C, the first and second MR elements 35a, 36a are circularly arranged side by side. The first MR element 35a is made up of a plurality of sensor sections S arranged in one hemicircle and the second MR element 36a is made up of a plurality of sensor sections S arranged in another hemicircle. At both ends, the first and second MR elements 35a, 36a are spaced from one another by a distance equal to $(n+1/4)\lambda$ where n is 0 or a positive integer.

Figure 5A:
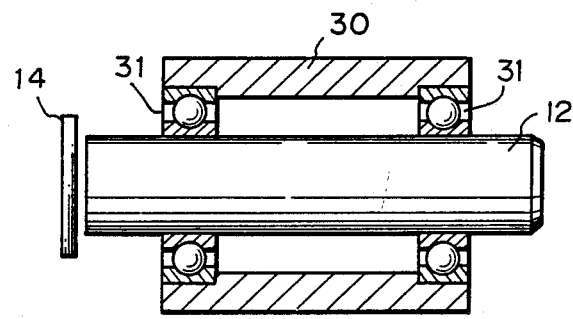
FIGS. 5A and 5B are sectional side views of supporting constructions for a rotary shaft of the magnetic encoder shown in FIG. 1.
Figure 5B:
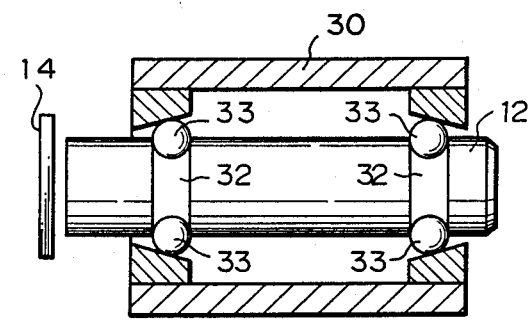

One supporting construction for the rotary shaft 12 is shown in FIG. 5A, in which the rotary shaft 12 is rotatably supported in a cylindrical housing 30 via bearings 31. Another supporting construction for the rotary shaft 12 is shown in FIG. 5B, in which two spaced annular recesses 32 are formed in the peripheral face of the rotary shaft 12 and several balls 33 are rotatably accommodated in each annular recess 32 in rolling contact with the cylindrical inner wall of a housing 30.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

We claim:

1. An improved magnetic encoder, comprising:
    a housing having an axial through-hole;
    a magnetic rotary spindle rotatably supported in said axial through-hole of said housing and provided with a magnetized pattern formed circularly on its one longitudinal end face along the periphery; and
    a magnetic sensor attached to said housing and facing said magnetized pattern on said one longitudinal end face of said rotary spindle with a prescribed clearance;
    said magnetized pattern being formed by use of a sine wave of a wavelength $\lambda$ and having a constant pitch equal to said wavelength $\lambda$;
    said magnetic sensor being made up of first and second magnetic resistor elements which (i) vary in inherent resistance depending on the intensity of an applied magnetic field and which (ii) are electrically separated from each other by an insulating layer;
    each said first magnetic resistor element being phased from an adjacent second magnetic resistor element by a distance equal to $\lambda/4$; and
    said first and second magnetic resistor elements being arranged in a circular disposition just corresponding to the circular arrangement of said magnetized pattern on said one longitudinal face of said rotary spindle; being circularly arranged side-by-side, each forming a hemicircle; and being concentrically arranged without superposition.

2. A device for magnetically detecting displacement of a separate, mobile body, comprising:

a housing having an axial through-hole;

a magnetic rotary spindle (i) rotatably supported in said axial through-hole of said housing, (ii) provided with a magnetized pattern directly formed on one of its longitudinal end faces along the periphery, and (iii) being made of one of Fe—Cr—Co and Fe—Co—Mg type alloys;

a mechanical coupling connected to said spindle for coupling said spindle to the mobile body; and a magnetic sensor attached to said housing and facing said magnetized pattern on said one longitudinal end face of said rotary spindle with a prescribed clearance;

said magnetized pattern being formed by use of a sine wave of a wavelength $\lambda$ and having a constant pitch equal to said wavelength $\lambda$;

said magnetic sensor being made up of a plurality of magnetic resistor elements which vary in inherent resistance depending on the intensity of an applied magnetic field, including first magnetic resistor elements and second magnetic resistor elements electrically separated from each other by an insulating layer;

said first and second magnetic resistor elements being arranged in a circular disposition just corresponding to the circular arrangement of said magnetized pattern on said one longitudinal face of said rotary spindle;

each said first magnetic resistor element being phased from an adjacent second magnetic resistor element by a distance equal to $\lambda/4$;

said first and second magnetic resistor elements being concentrically arranged without superposition; and said first and second magnetic resistor elements being circularly arranged side-by-side, each forming a hemicircle.

* * * * *